(12) United States Patent
Ma et al.

(10) Patent No.: US 12,515,151 B2
(45) Date of Patent: Jan. 6, 2026

(54) WATER-FILTRATION DEVICE

(71) Applicant: Caware Filtering Corporation, Kaohsiung (TW)

(72) Inventors: Wu-Yang Ma, Kaohsiung (TW); Min-Hua Chang, Kaohsiung (TW); Jiann-Hsing Chuang, Kaohsiung (TW)

(73) Assignee: CAWARE FILTERING CORPORATION, Kaohsiung (TW)

( * ) Notice: Subject to any disclaimer, the term of this patent is extended or adjusted under 35 U.S.C. 154(b) by 555 days.

(21) Appl. No.: 17/990,917

(22) Filed: Nov. 21, 2022

(65) Prior Publication Data

US 2024/0058730 A1  Feb. 22, 2024

(30) Foreign Application Priority Data

Aug. 17, 2022  (TW) .................................. 111130889

(51) Int. Cl.
*B01D 35/147* (2006.01)
*B01D 29/15* (2006.01)
(Continued)

(52) U.S. Cl.
CPC ........... *B01D 35/147* (2013.01); *B01D 29/15* (2013.01); *B01D 29/52* (2013.01); *B01D 29/56* (2013.01);
(Continued)

(58) Field of Classification Search
CPC .. B01D 35/147; B01D 35/1573; B01D 35/30; B01D 29/56; B01D 29/58; B01D 2201/167; B01D 2201/347; B01D 2201/302; C02F 1/003; C02F 2201/004; C02F 2201/005; C02F 2301/043
See application file for complete search history.

(56) References Cited

U.S. PATENT DOCUMENTS 8,894,848 B2  11/2014  Scholz
9,872,584 B2 *  1/2018  Mazzoni .................. B01J 39/07
(Continued)

FOREIGN PATENT DOCUMENTS

EP  2206543 B1  5/2016

OTHER PUBLICATIONS

JP 3377778 and English translation (Year: 2003).*

*Primary Examiner* — Benjamin M Kurtz
(74) *Attorney, Agent, or Firm* — BACON & THOMAS, PLLC

(57) ABSTRACT

A water-filtration device filtrates water, has a main-filtration path and a bypassing-filtration path, and comprises a filter head, a water filter, a guiding assembly and an adjusting valve movably mounted at the filter head. The guiding assembly is mounted at the filter head and connected to the water filter. An O-ring of the adjusting valve can block an end of a bypassing portion of the guiding assembly. In the main-filtration path, water entering from a water inlet of the filter head does not pass through the bypassing portion, thereby completely passing through filter materials in a first filtrating room and a second filtrating room of the water filter. Water in the bypassing-filtration path passes through the bypassing portion and the filter material in the first filtrating room. The O-ring does not reach into the bypassing portion, thereby reducing wear and damage to the O-ring, and avoiding water leakage.

16 Claims, 9 Drawing Sheets

(51) Int. Cl.
*B01D 29/52* (2006.01)
*B01D 29/56* (2006.01)
*B01D 35/157* (2006.01)
*B01D 35/30* (2006.01)
*C02F 1/00* (2023.01)

(52) U.S. Cl.
CPC ......... *B01D 35/1573* (2013.01); *B01D 35/30* (2013.01); *C02F 1/003* (2013.01); *B01D 2201/0453* (2013.01); *B01D 2201/167* (2013.01); *B01D 2201/287* (2013.01); *B01D 2201/347* (2013.01); *C02F 2201/004* (2013.01); *C02F 2201/005* (2013.01); *C02F 2301/043* (2013.01); *C02F 2303/14* (2013.01)

(56) References Cited

U.S. PATENT DOCUMENTS

| | | | |
|---|---|---|---|
| 2008/0142426 A1 | 6/2008 | Greco et al. | |
| 2010/0170841 A1* | 7/2010 | An | B01D 35/30 |
| | | | 137/511 |
| 2016/0200612 A1* | 7/2016 | Lee | B01D 15/361 |
| | | | 210/202 |

* cited by examiner

WATER-FILTRATION DEVICE

BACKGROUND OF THE INVENTION

1. Field of the Invention

The present invention relates to a filtrating device having a function of bypassing, especially to a water-filtration device that has a main-filtration path and a bypassing-filtration path and can adjust a filtrating level of water running through it.

2. Description of the Prior Arts

For hygiene and safety, water should be filtrated by a water-filtration device before provided to people to drink nowadays. The water-filtration device comprises a filter head and a water filter. The filter head has a water inlet and a water outlet. The water filter is connected to the filter head and contains a filter material inside. The water-filtration device is connected to a water pipeline with the water inlet of the filter head connected to an inlet tube and the water outlet connected to an outlet tube. When entering the water inlet of the inlet tube, water is fed into the water filter and passes through the filter material inside the water filter. Therefore impurities and minerals in water are filtrated away by the filter material, and filtrated water passes through the water outlet of the filter head and is fed toward the outlet tube to be discharged.

Besides, because the taste of water will be changed after the minerals in water are filtrated away, for maintaining the taste of water, there is a conventional bypassing-filtration device. With reference to FIG. 9, the bypassing-filtration device comprises a filter head 80, a water filter and a bypassing assembly 90. The bypassing assembly 90 is mounted between the filter head 80 and the water filter and has a bypassing tube 91 and an altering plug 92 mounted in the bypassing tube 91. The bypassing tube 91 has multiple altering holes 93. By controlling a depth of the altering plug 92 reaching into the bypassing tube 91, an amount of the altering holes 93 that water can pass is controlled. Furthermore, the altering plug 92 has an O-ring 94 to prevent water leakage.

Water can enter and exit the filter head 80 by two paths: a main-filtration path and a bypassing-filtration path. In the main-filtration path, water enters from the water inlet of the filter head 80, passes through the water filter to be completely filtrated, and is discharged from the water outlet of the filter head 80. In the bypassing-filtration path, water enters from the water inlet of the filter head 80, then enters the bypassing tube 91, and passes through the altering holes 93 of the bypassing tube 91 before fed into the water outlet of the filter head 80. At this time, water is not completely filtrated, thereby keeping part of the minerals. By mixing the water passing the main-filtration path and the water passing the bypassing-filtration path, the bypassing-filtration device can filtrate most amount of water while keeping some of the minerals, thereby maintaining the taste of water.

In addition, when a user controls the depth of the altering plug 92 reaching into the bypassing tube 91, a position of the O-ring 94 of the altering plug 92 is changed. By the O-ring 94 preventing water from passing through the altering holes 93 of the bypassing tube 91, the amount of water passing through the bypassing-filtration path is controlled. However, when controlling the depth of the altering plug 92, the O-ring 94 of the altering plug 92 passes through the altering holes 93 and is rubbed by edges of the altering holes 93. The O-ring 94 may be worn out due to frequent adjusting of the altering plug 92, leading to water leakage. Therefore the user needs to replace a whole set of the bypassing-filtration device, raising the cost of usage, and thus the bypassing-filtration device needs to be improved.

SUMMARY OF THE INVENTION

The present invention is to resolve the drawback that structural design of a bypassing assembly of a bypassing-filtration device nowadays leads to that an O-ring of an altering plug of the bypassing assembly may be rubbed by edges of altering holes of a bypassing tube of the bypassing assembly. Frequently rubbed, the O-ring may be worn out and leads to water leakage, and therefore a user needs to replace a whole set of the bypassing-filtration device.

A water-filtration device of the present invention comprises a filter head, a water filter, a guiding assembly and an adjusting valve. The filter head has a water inlet and a water outlet. The water filter is detachably mounted at a bottom of the filter head, and has a filter housing, a first filtrating room, a second filtrating room and a connecting tube. The first filtrating room is disposed inside the filter housing. The second filtrating room is disposed inside the filter housing and under the first filtrating room, and is connected to the first filtrating room. The connecting tube is mounted through the first filtrating room and the second filtrating room, and a bottom of the connecting tube is connected to the second filtrating room. Each of the first filtrating room and the second filtrating room contains one-filter material. The guiding assembly is mounted at the filter head and disposed inside the water filter. The guiding assembly comprises a first guiding portion connected to the water inlet, a second guiding portion connected to the water outlet, and a bypassing portion. The bypassing portion has a cooperating end and a connecting end. The cooperating end is connected to the connecting tube and has a cooperating recess tapered inward. The connecting end is opposite to the cooperating end and is connected to the first filtrating room. The guiding assembly is connected to and cooperates with an inner side of the water filter to form a main-filtration path and a bypassing-filtration path. The main-filtration path is connected to the water inlet and the water outlet. The bypassing-filtration path is connected to the water inlet and the water outlet. The bypassing-filtration path passes through the bypassing portion. The adjusting valve is movably mounted at the filter head, and comprises an adjusting bar having a conical tip and an O-ring. The conical tip is tapered toward an end of the adjusting bar and is capable of reaching into the cooperating recess of the bypassing portion. The O-ring is adjacent to the conical tip and is at a side of the conical tip that is away from the said end of the adjusting bar. The adjusting valve is operable to make the O-ring contact or move away from the cooperating recess of the bypassing portion, thereby closing or opening the bypassing-filtration path.

The present invention is configured to filtrate water. The water inlet of the filter head is connected to an external inlet tube, and the water outlet of the filter head is connected to an external outlet tube. While passing through the main-filtration path, water enters the water filter through the first guiding portion of the guiding assembly. Then water passes through the filter materials, which are respectively disposed in the first filtrating room and the second filtrating room, to be filtrated completely. After that, water is led to the water outlet of the filter head and does not pass through the bypassing portion. In the bypassing-filtration path, by the bypassing portion of the guiding assembly, water only passes through the first filtrating room of the water filter before being guided to the second guiding portion of the guiding assembly. Therefore, water does not pass through the filter material in the second filtrating room and is not completely filtrated, thereby keeping some of the minerals.

Additionally, by operating the adjusting valve, a user can move the O-ring of the adjusting bar to contact the cooperating recess of the bypassing portion. Therefore, the cooperating end of the bypassing portion is closed, thereby closing the bypassing-filtration path, so water cannot pass the bypassing portion. Because the O-ring contacts the tapered cooperating recess and blocks the cooperating end of the bypassing portion, the O-ring does not reach into the bypassing portion. The O-ring would not be worn out to damage, thereby preventing water leakage, so the user does not need to replace the whole set of the present invention, saving the cost of usage.

DETAILED DESCRIPTION OF THE PREFERRED EMBODIMENTS

Figure 1:
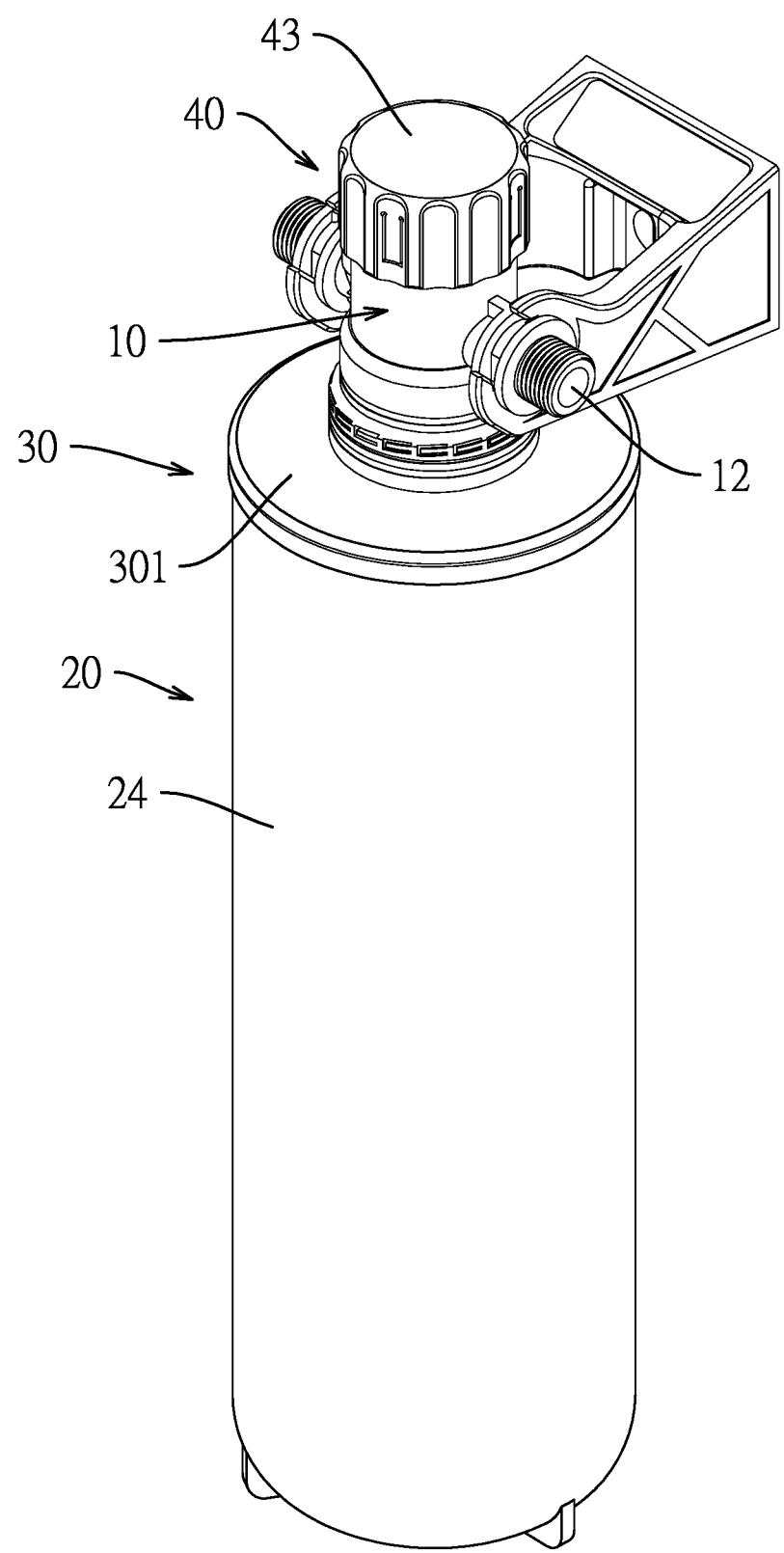
FIG. 1 is a perspective view of an embodiment of a water-filtration device in accordance with the present invention.
Figure 2:
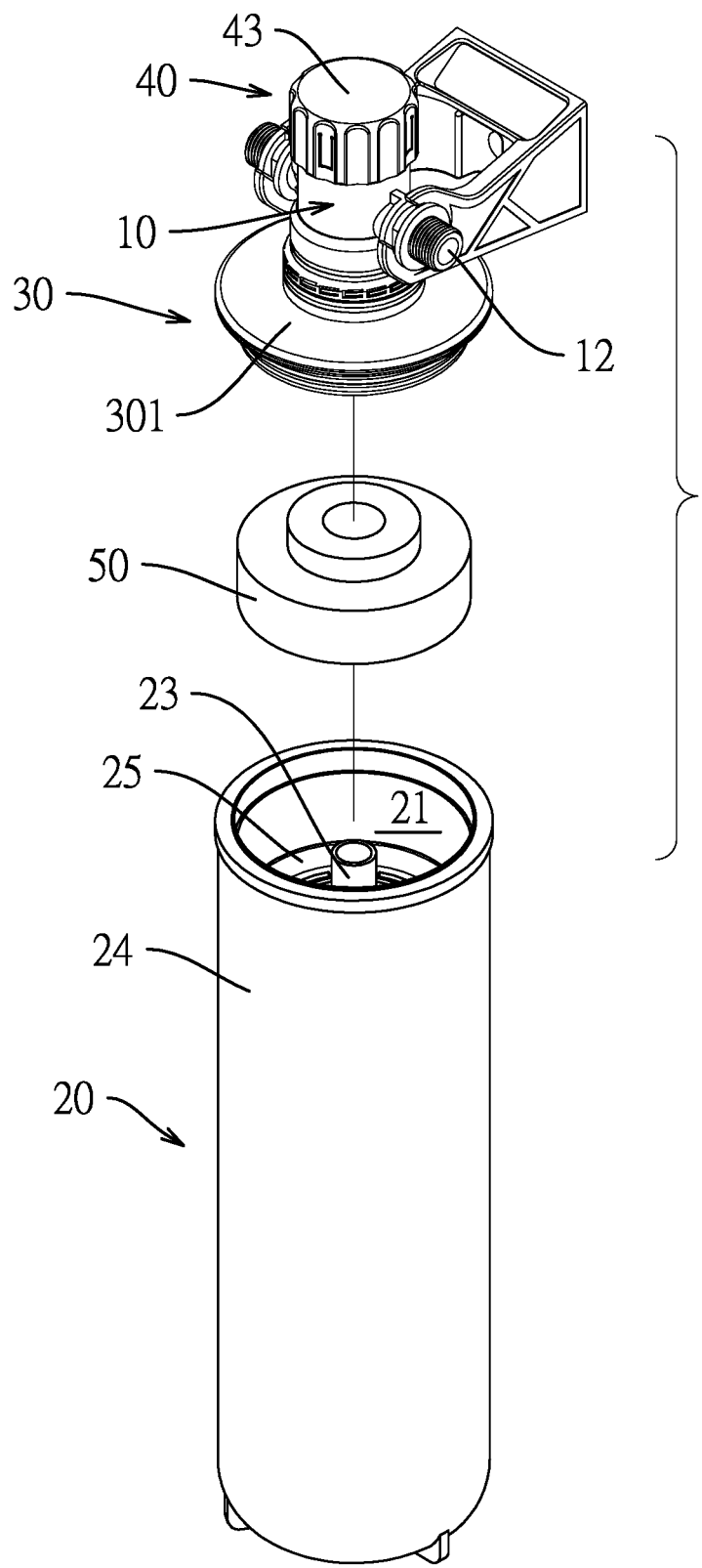
FIG. 2 is a partial exploded view of the water-filtration device in FIG. 1.
Figure 3:
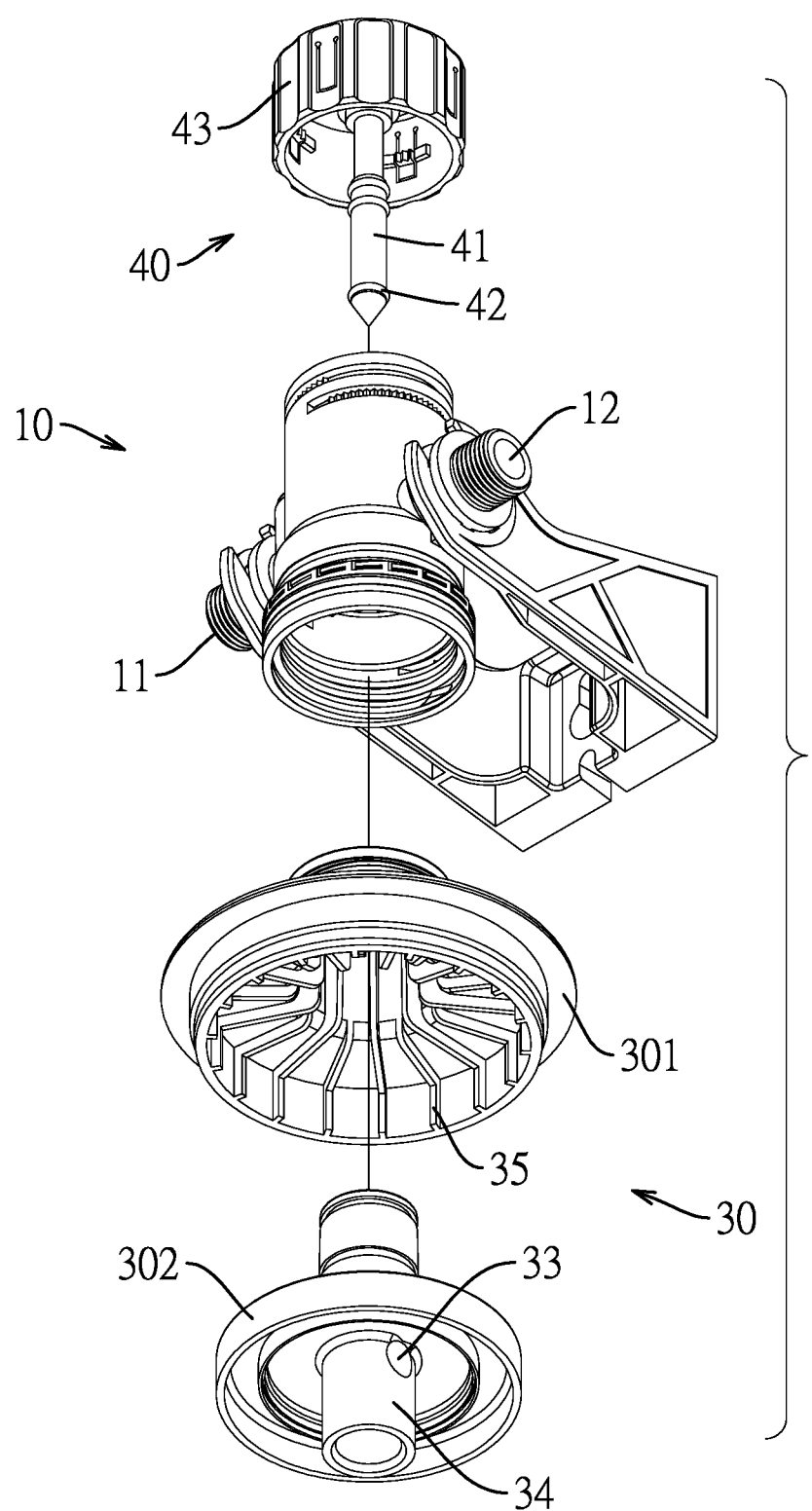
FIG. 3 is a partial exploded view of a filter head, a guiding assembly and an adjusting valve of the water-filtration device in FIG. 1.

FIGS. 1 to 3 show an embodiment of a water-filtration device in accordance with the present invention. The water-filtration device comprises a filter head 10, a water filter 20, a guiding assembly 30 and an adjusting valve 40.

With reference to FIGS. 1 to 4, the filter head 10 has a water inlet 11 and a water outlet 12.

Figure 4:
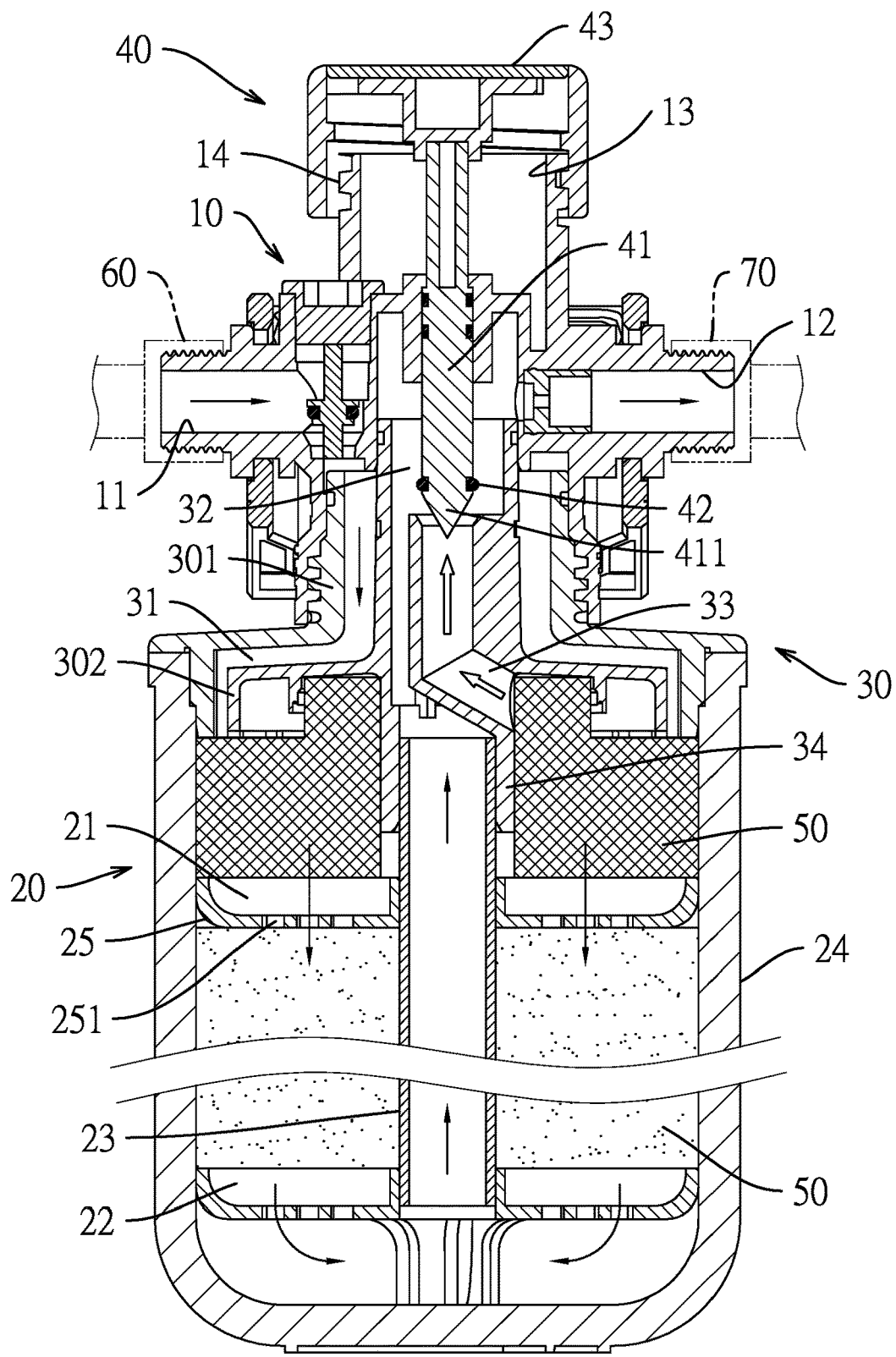
FIG. 4 is a sectional view of a first embodiment of the water-filtration device in accordance with the present invention.

With reference to FIGS. 1, 2 and 4, the water filter 20 is detachably mounted at a bottom of the filter head 10, and has a filter housing 24, a first filtrating room 21, a second filtrating room 22 and a connecting tube 23. The first filtrating room 21 and the second filtrating room 22 are disposed inside the filter housing 24. The second filtrating room 22 is under the first filtrating room 21 and is connected to the first filtrating room 21. The connecting tube 23 is mounted through the first filtrating room 21 and the second filtrating room 22, and a bottom of the connecting tube 23 is connected to the second filtrating room 22. Each of the first filtrating room 21 and the second filtrating room 22 contains one filter material 50. Additionally, the filter materials 50 in the first filtrating room 21 and the second filtrating room 22 can be different and can filtrate different kinds of contaminants in water, so manufacturers can choose according to needs.

Figure 5:
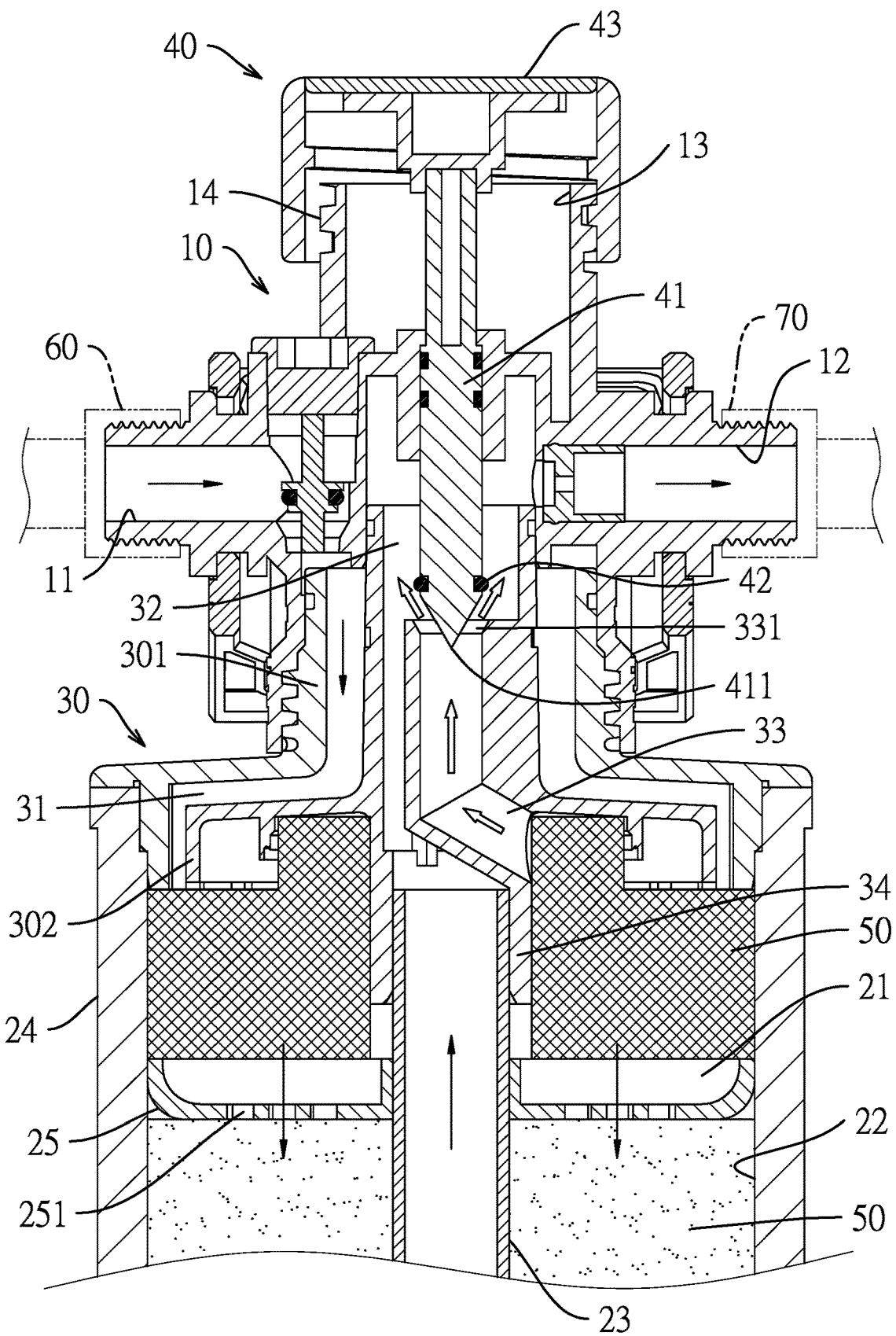
FIG. 5 is a partial sectional view of the first embodiment of the water-filtration device in FIG. 4.

With reference to FIGS. 1 to 4, the guiding assembly 30 is mounted at the filter head 10 and disposed inside the water filter 20. The guiding assembly 30 comprises a first guiding portion 31 connected to the water inlet 11, a second guiding portion 32 connected to the water outlet 12, and a bypassing portion 33. With reference to FIG. 5, the bypassing portion 33 has a cooperating end and a connecting end. The cooperating end is connected to the connecting tube 23 and has a cooperating recess 331 tapered inward. The connecting end is opposite to the cooperating end and is connected to the first filtrating room 21. The guiding assembly 30 is connected to and cooperates with an inner side of the water filter 20 to form a main-filtration path and a bypassing-filtration path. The main-filtration path is connected to the water inlet 11 and the water outlet 12. The bypassing-filtration path is connected to the water inlet 11 and the water outlet 12. The bypassing-filtration path passes through the bypassing portion 33.

Besides, the connecting tube 23 is disposed at an interior of the filter housing 24 and is at a middle of the interior of the filter housing 24. The water filter 20 comprises two separating elements 25 disposed at the interior of the filter housing 24, vertically disposed apart from each other, and surrounding the connecting tube 23. The guiding assembly 30 is detachably mounted on a top of the filter housing 24 and reaches into the water filter 20. The first filtrating room 21 is disposed between the guiding assembly 30 and one of the two separating elements 25, which is above the other one of the two separating elements 25. The second filtrating room 22 is disposed between the two separating elements 25. Furthermore, each one of the two separating elements 25 has multiple flowing-through holes 251 for water to flow through.

With reference to FIGS. 3 and 4, the adjusting valve 40 is movably mounted at the filter head 10, and comprises an adjusting bar 41 having an O-ring 42. The adjusting valve 40 is operable to make the O-ring 42 contact or move away from the cooperating recess 331 of the bypassing portion 33, thereby closing or opening the bypassing-filtration path.

In addition, in the main-filtration path, water is fed in from the water inlet 11 of the filter head 10, and passes through the first guiding portion 31 of the guiding assembly 30, the water filter 20 and the second guiding portion 32 of the guiding assembly 30. Then water is discharged from the water outlet 12 of the filter head 10.

Additionally, the guiding assembly 30 comprises a filter-top cap 301, mounted at the filter head 10 and connected to the water filter 20, and a top-cap diverter 302 mounted inside the filter-top cap 301. The top-cap diverter 302 has a connecting portion 34 detachably connected to the connecting tube 23 of the water filter 20. The bypassing portion 33 is formed inside the top-cap diverter 302 and is in fluid communication with the connecting portion 34.

Furthermore, the filter-top cap 301 has multiple guiding ribs 35 annularly disposed inside the filter-top cap 301, and contacting the top-cap diverter 302.

Figure 6:
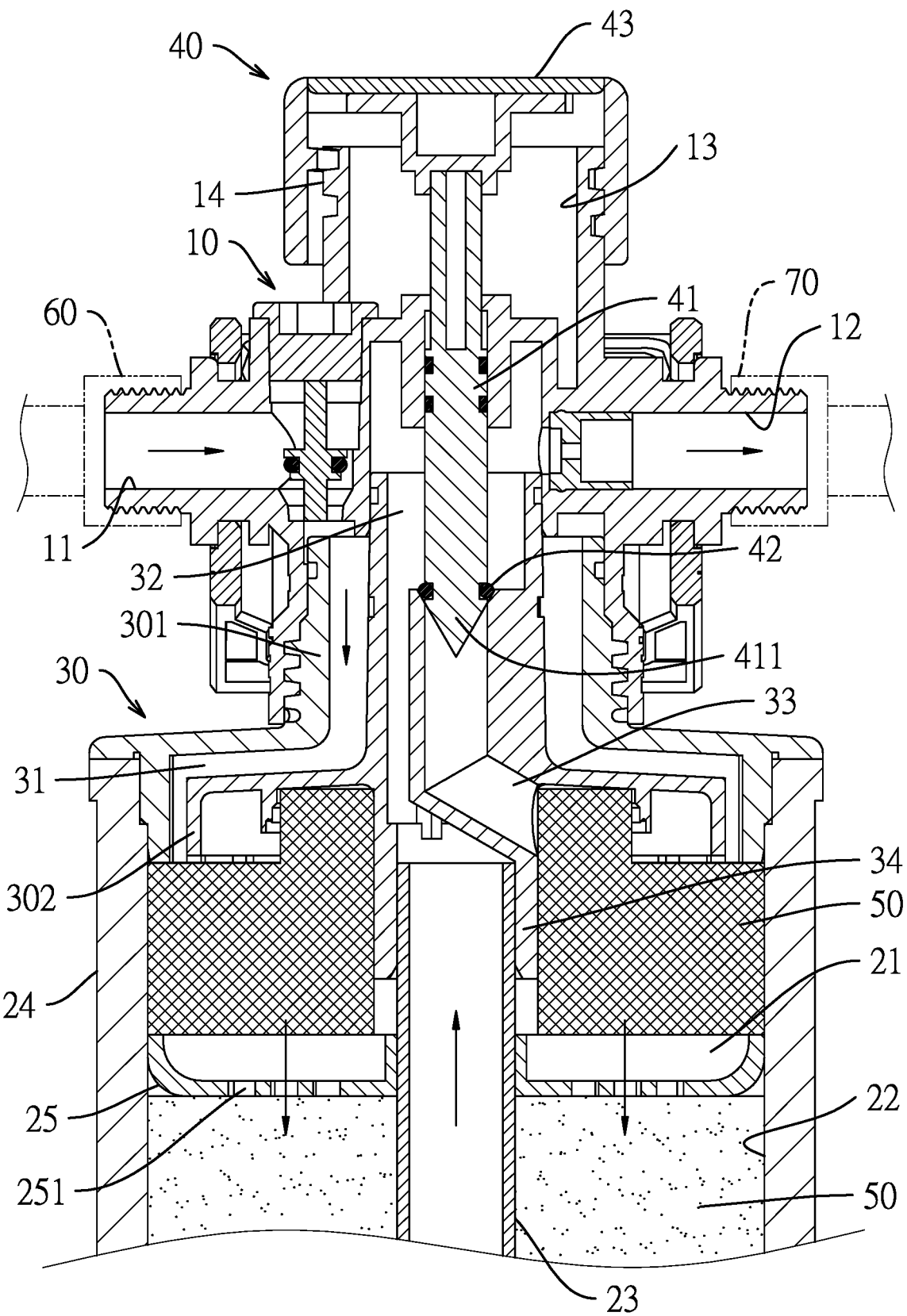
FIG. 6 is a partial sectional view of a bypassing portion of the first embodiment of the water-filtration device in FIG. 4, shown closed.

With reference to FIGS. 4 to 6, in a first embodiment of the present invention, the first guiding portion 31 is formed between the filter-top cap 301 and the top-cap diverter 302. The second guiding portion 32 is formed inside the top-cap diverter 302 and is in fluid communication with the connecting portion 34 and the bypassing portion 33.

Figure 7:
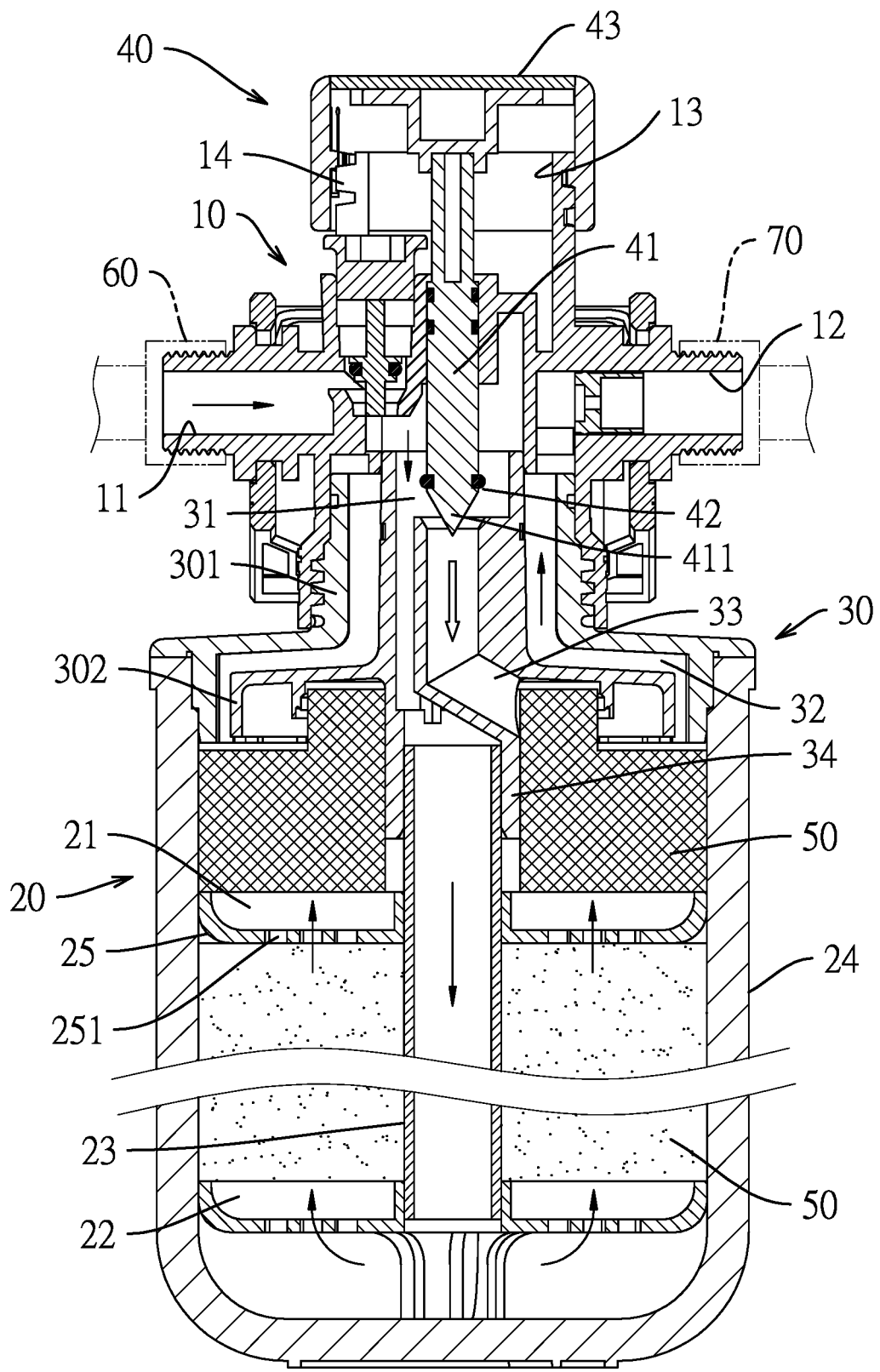
FIG. 7 is a sectional view of a second embodiment of the water-filtration device in accordance with the present invention.
Figure 8:
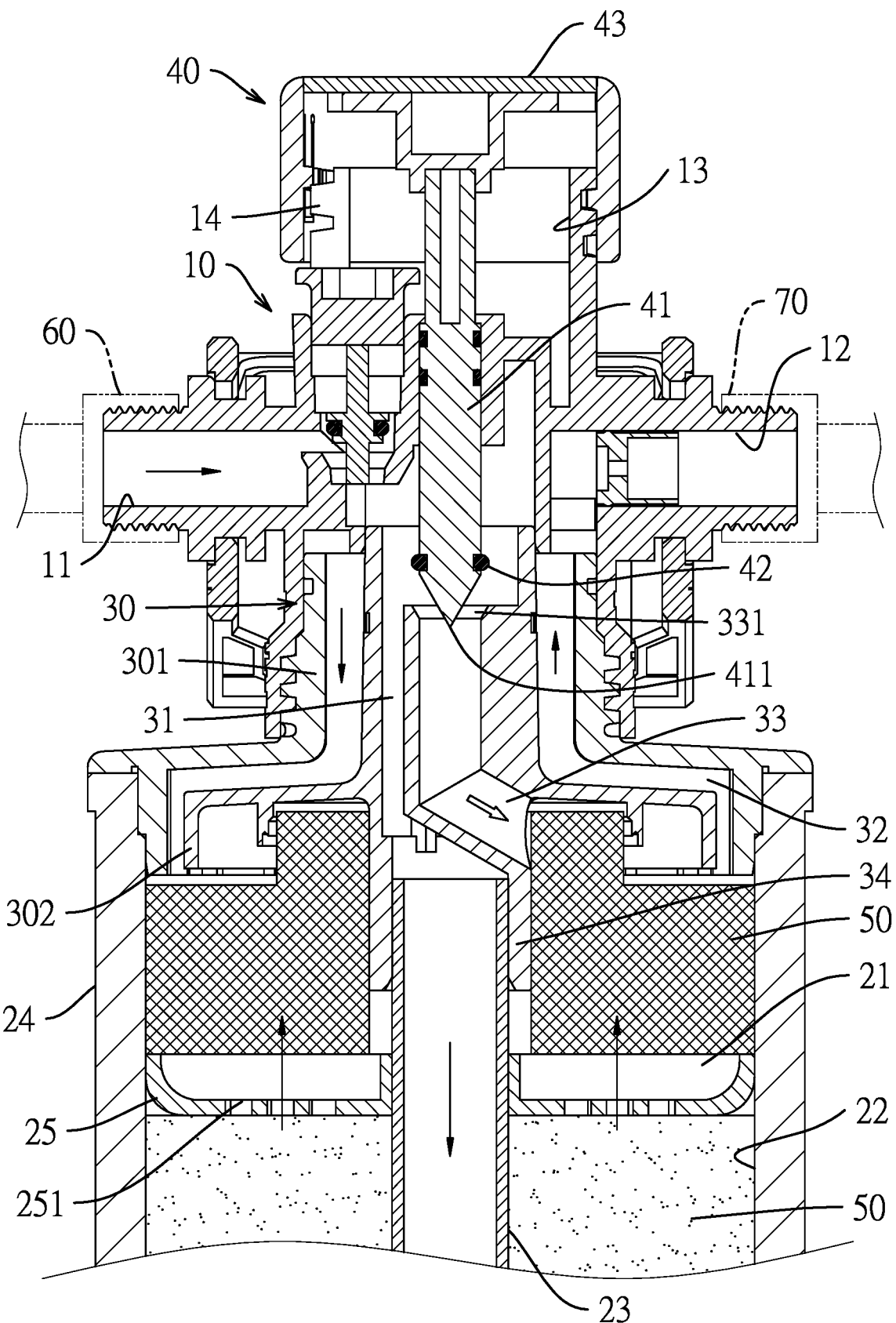
FIG. 8 is a partial sectional view of the second embodiment of the water-filtration device in FIG. 7.
Figure 9:
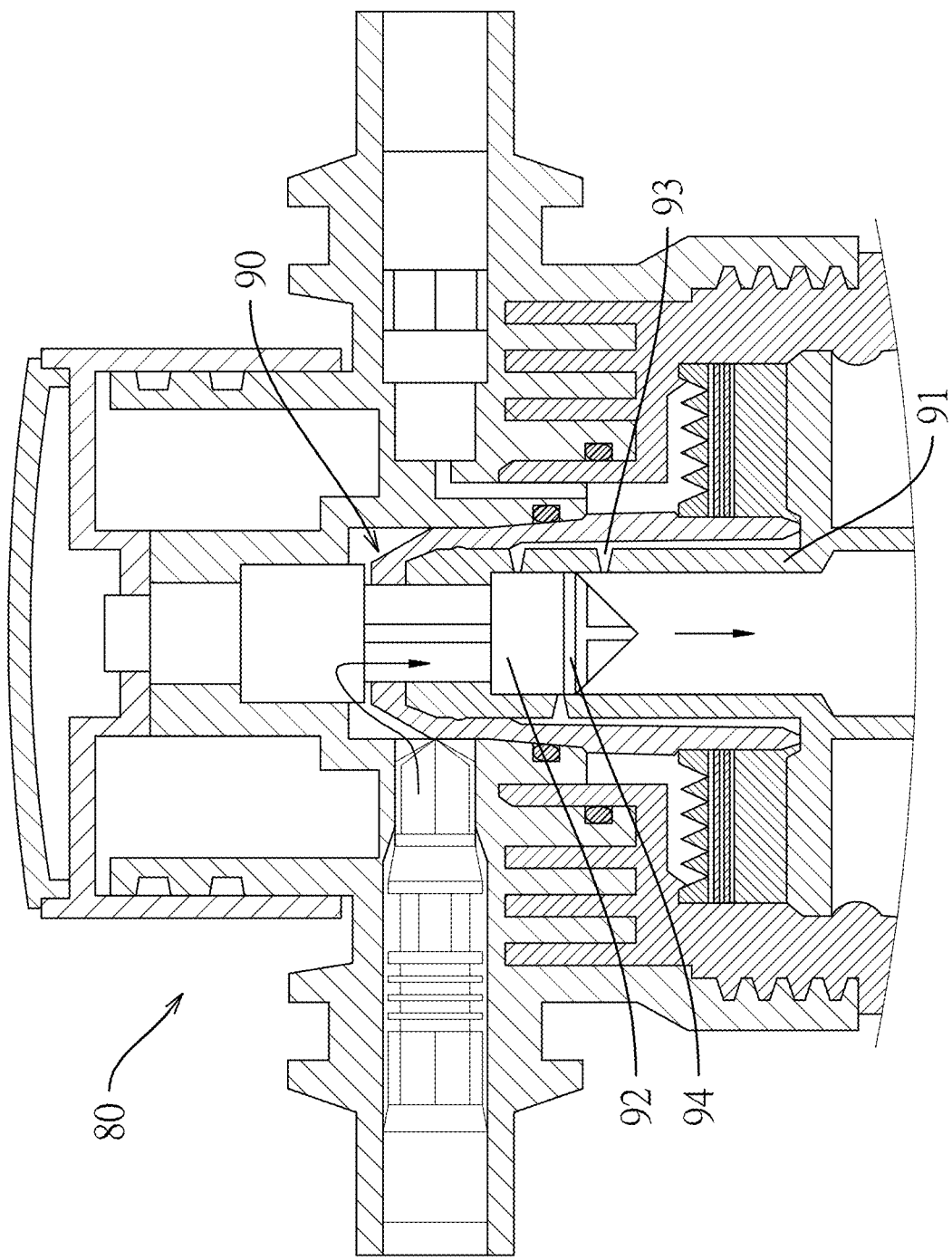
FIG. 9 is a partial sectional view of a prior art.

With reference to FIGS. 7 and 8, in a second embodiment of the present invention, the first guiding portion 31 is formed inside the top-cap diverter 302 and is in fluid communication with the connecting portion 34 and the bypassing portion 33. The second guiding portion 32 is formed between the filter-top cap 301 and the top-cap diverter 302.

Besides, a maximum outer diameter of the O-ring 42 of the adjusting bar 41 is larger than a minimum inner diameter of the cooperating recess 331. Furthermore, the adjusting bar 41 of the adjusting valve 40 has a conical tip 411 tapered toward an end of the adjusting bar 41. The conical tip 411 can reach into the cooperating recess 331 of the bypassing portion 33. The O-ring 42 is adjacent to the conical tip 411 and is at a side of the conical tip 411 that is away from the said end of the adjusting bar 41.

Moreover, the filter head 10 has a head opening 13, formed at a top of the filter head 10, and an outer thread 14 formed outside of the head opening 13. The adjusting valve 40 has an adjusting cap 43 movably threaded with the outer thread 14 of the filter head 10. The adjusting bar 41 is mounted at a bottom of the adjusting cap 43 and reaches into the head opening 13 of the filter head 10.

With reference to FIGS. 4 and 5, the present invention is configured to filtrate water. The water inlet 11 of the filter head 10 is connected to an external inlet tube 60, and the water outlet 12 of the filter head 10 is connected to an external outlet tube 70. In the first embodiment of the present invention, the first guiding portion 31 of the guiding assembly 30 is formed between the filter-top cap 301 and the top-cap diverter 302. The second guiding portion 32 is formed inside the top-cap diverter 302 and is in fluid communication with the connecting portion 34 and the bypassing portion 33. In the main-filtration path, water is fed into the first guiding portion 31 of the guiding assembly 30 from the water inlet 11 of the filter head 10. Then water passes through the filter material 50 in the first filtrating room 21 and the filter material 50 in the second filtrating room 22 to be filtrated completely. After that, water enters the guiding assembly 30 by passing through the connecting tube 23. Then water passes the connecting portion 34 and the second guiding portion 32, and is discharged from the water outlet 12 of the filter head 10. In the bypassing-filtration path, when entering the water filter 20, water is partially filtrated by passing through the filter material 50 in the first filtrating room 21. Water then enters the bypassing portion 33 of the guiding assembly 30, passes through the cooperating end of the bypassing portion 33, and flows to the second guiding portion 32 to be mixed with water passing the main-filtration path.

Additionally, with reference to FIG. 6, by operating the adjusting valve 40, a user can move the O-ring 42 of the adjusting bar 41 to block the cooperating recess 331 of the bypassing portion 33. Therefore, the cooperating end of the bypassing portion 33 is closed, so water cannot pass the bypassing portion 33, thereby closing the bypassing-filtration path. The O-ring 42 contacts the tapered cooperating recess 331 and does not reach into the bypassing portion 33, and the O-ring 42 only blocks the cooperating end of the bypassing portion 33, so the O-ring 42 would not be worn out to damage easily. Therefore water leakage is prevented, so the user does not need to replace the whole set of the present invention, thereby saving the cost of usage.

Besides, by the design of the cooperating recess 331 of the bypassing portion 33, the need for positioning precision of the adjusting bar 41 and the O-ring 42 toward the bypassing portion 33 is decreased. By that, the manufacturing difficulty decreases and the O-ring 42 can close the bypassing portion 33 more tightly. When the user operates the adjusting valve 40, by the conical tip 411 of the adjusting bar 41 cooperating with the cooperating recess 331 of the bypassing portion 33, an amount of water passing the bypassing portion 33 is controlled. That means the deeper the conical tip 411 reaches into the bypassing portion 33, the smaller the amount of water passes the bypassing portion 33. By that, the amount of water passing the bypassing portion 33 can be controlled according to needs, thereby increasing functionality and ease of usage of the present invention.

With reference to FIGS. 7 and 8, in the second embodiment of the present invention, the first guiding portion 31 of the guiding assembly 30 is formed inside the top-cap diverter 302 and is in fluid communication with the connecting portion 34 and the bypassing portion 33. The second guiding portion 32 is formed between the filter-top cap 301 and the top-cap diverter 302. In the main-filtration path, water is fed into the first guiding portion 31 of the guiding assembly 30 from the external inlet tube 60, passes through the water inlet 11 of the filter head 10, then passes through the connecting portion 34 to enter the connecting tube 23 of the water filter 20. And then, from a bottom of the water filter 20, water passes through the filter material 50 in the second filtrating room 22 and the filter material 50 in the first filtrating room 21 to be filtrated completely. After that, water enters the second guiding portion 32 of the guiding assembly 30, and is discharged from the water outlet 12 of the filter head 10 toward the external outlet tube 70. In the bypassing-filtration path, when entering the first guiding portion 31, water passes through the cooperating recess 331 to enter the bypassing portion 33. Then water is fed into the first filtrating room 21 of the water filter 20 and then passes through the filter material 50 in the first filtrating room 21 to be partially filtrated. After that, water flows to the second guiding portion 32 to be mixed with water passing the main-filtration path.

In either the first or second embodiment of the present invention, water passing the main-filtration path passes the two filter materials 50 that are respectively in the first filtrating room 21 and the second filtrating room 22. After that, water is fed into the water outlet 12 of the filter head 10, thus being completely filtrated. While passing the bypassing-filtration path, water passes the bypassing portion 33 of the guiding assembly 30 and only passes through the first filtrating room 21 of the water filter 20 before being guided to the water outlet 12. Therefore water is not completely filtrated and can keep some of the minerals according to the material property of the filter material 50 in the first filtrating room 21.

Besides, in the first embodiment of the present invention, the multiple guiding ribs 35 between the filter-top cap 301 and the top-cap diverter 302 are inside the first guiding portion 31. The multiple guiding ribs 35 separate water fed from the water inlet 11 of the filter head 10, making water enter the water filter 20 more evenly, and thereby increasing flowing efficiency and filtrated efficiency of water. In the second embodiment of the present invention, the multiple guiding ribs 35 are inside the second guiding portion 32. The multiple guiding ribs 35 separate water passing through the first filtrating room 21 of the water filter 20, therefore water can be discharged from the water filter 20 smoothly.

Furthermore, because impurities and minerals in water are filtrated away by the filter materials 50 of the water filter 20, the user only needs to change the water filter 20 regularly to avoid decreasing the filtration efficiency. The filter head 10, the guiding assembly 30 and the adjusting valve 40 do not need to be replaced regularly.

To sum up, the present invention is configured to filtrate water and has the main-filtration path and the bypassing-filtration path. Water passing the main-filtration path does not pass through the bypassing portion 33 of the guiding assembly 30, and therefore it completely passes through the water filter 20 to be filtrated. Water passing the bypassing-filtration path only passes through the first filtrating room 21. Because the O-ring 42 of the adjusting bar 41 of the adjusting valve 40 does not reach into the bypassing portion 33, the weariness of the O-ring 42 is decreased to prevent damage, therefore to effectively avoid water leakage.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A water-filtration device comprising:
   a filter head having
      a water inlet;
      a water outlet;
   a water filter detachably mounted at a bottom of the filter head, and having
      a filter housing;
      a first filtrating room disposed inside the filter housing;
      a second filtrating room disposed inside the filter housing and under the first filtrating room, and connected to the first filtrating room;
      a connecting tube mounted through the first filtrating room and the second filtrating room, and a bottom of the connecting tube connected to the second filtrating room;
   wherein each of the first filtrating room and the second filtrating room contains one filter material;
   a guiding assembly mounted at the filter head and disposed inside the water filter, and comprising
      a first guiding portion connected to the water inlet;
      a second guiding portion connected to the water outlet;
      a bypassing portion having
         a cooperating end connected to the connecting tube, and having
            a cooperating recess tapered inward;
         a connecting end opposite to the cooperating end, and connected to the first filtrating room;
   wherein the guiding assembly is connected to and cooperates with an inner side of the water filter to form
      a main-filtration path connected to the water inlet and the water outlet; and
      a bypassing-filtration path connected to the water inlet and the water outlet and passing through the bypassing portion; and
   an adjusting valve movably mounted at the filter head, and comprising
      an adjusting bar having
         a conical tip tapered toward an end of the adjusting bar and capable of reaching into the cooperating recess of the bypassing portion;
         an O-ring adjacent to the conical tip and at a side of the conical tip that is away from the said end of the adjusting bar;
   wherein the adjusting valve is operable to make the O-ring contact or move away from the cooperating recess of the bypassing portion, thereby closing or opening the bypassing-filtration path.

2. The water-filtration device as claimed in claim 1, wherein
   the guiding assembly comprises
      a filter-top cap mounted at the filter head and connected to the water filter; and
      a top-cap diverter mounted inside the filter-top cap, and having
         a connecting portion detachably connected to the connecting tube of the water filter;
      the bypassing portion is formed inside the top-cap diverter and is in fluid communication with the connecting portion.

3. The water-filtration device as claimed in claim 2, wherein
   the first guiding portion is formed between the filter-top cap and the top-cap diverter; and the second guiding portion is formed inside the top-cap diverter and is in fluid communication with the connecting portion and the bypassing portion.

4. The water-filtration device as claimed in claim 2, wherein
   the first guiding portion is formed inside the top-cap diverter and is in fluid communication with the connecting portion and the bypassing portion; and the second guiding portion is formed between the filter-top cap and the top-cap diverter.

5. The water-filtration device as claimed in claim 2, wherein the filter-top cap has multiple guiding ribs annularly disposed inside the filter-top cap, and contacting the top-cap diverter.

6. The water-filtration device as claimed in claim 3, wherein the filter-top cap has multiple guiding ribs annularly disposed inside the filter-top cap, and contacting the top-cap diverter.

7. The water-filtration device as claimed in claim 4, wherein the filter-top cap has multiple guiding ribs annularly disposed inside the filter-top cap, and contacting the top-cap diverter.

8. The water-filtration device as claimed in claim 1, wherein a maximum outer diameter of the O-ring of the adjusting bar is larger than a minimum inner diameter of the cooperating recess.

9. The water-filtration device as claimed in claim 6, wherein a maximum outer diameter of the O-ring of the adjusting bar is larger than a minimum inner diameter of the cooperating recess.

10. The water-filtration device as claimed in claim 7, wherein a maximum outer diameter of the O-ring of the adjusting bar is larger than a minimum inner diameter of the cooperating recess.

11. The water-filtration device as claimed in claim 1, wherein
   the filter head has
      a head opening formed at a top of the filter head;
      an outer thread formed outside of the head opening;
   the adjusting valve has
      an adjusting cap movably threaded with the outer thread of the filter head;
   the adjusting bar is mounted at a bottom of the adjusting cap and is capable of reaching into the head opening of the filter head.

12. The water-filtration device as claimed in claim 9, wherein
   the filter head has
      a head opening formed at a top of the filter head;

an outer thread formed outside of the head opening;
the adjusting valve has
an adjusting cap movably threaded with the outer thread of the filter head;
the adjusting bar is mounted at a bottom of the adjusting cap and is capable of reaching into the head opening of the filter head.

13. The water-filtration device as claimed in claim 10, wherein
the filter head has
a head opening formed at a top of the filter head;
an outer thread formed outside of the head opening;
the adjusting valve has
an adjusting cap movably threaded with the outer thread of the filter head;
the adjusting bar is mounted at a bottom of the adjusting cap and is capable of reaching into the head opening of the filter head.

14. The water-filtration device as claimed in claim 1, wherein
the connecting tube is disposed at an interior of the filter housing and is at a middle of the interior of the filter housing;
the water filter comprises
two separating elements disposed at the interior of the filter housing, vertically disposed apart from each other, and mounted around the connecting tube;
the guiding assembly is detachably mounted on a top of the filter housing and reaches into the water filter;
the first filtrating room is disposed between the guiding assembly and one of the two separating elements, which is above the other one of the two separating elements, and the second filtrating room is disposed between the two separating elements.

15. The water-filtration device as claimed in claim 12, wherein
the connecting tube is disposed at an interior of the filter housing and is at a middle of the interior of the filter housing;
the water filter comprises
two separating elements disposed at the interior of the filter housing, vertically disposed apart from each other, and mounted around the connecting tube;
the guiding assembly is detachably mounted on a top of the filter housing and reaches into the water filter;
the first filtrating room is disposed between the guiding assembly and one of the two separating elements, which is above the other one of the two separating elements, and the second filtrating room is disposed between the two separating elements.

16. The water-filtration device as claimed in claim 13, wherein
the connecting tube is disposed at an interior of the filter housing and is at a middle of the interior of the filter housing;
the water filter comprises
two separating elements disposed at the interior of the filter housing, vertically disposed apart from each other, and mounted around the connecting tube;
the guiding assembly is detachably mounted on a top of the filter housing and reaches into the water filter;
the first filtrating room is disposed between the guiding assembly and one of the two separating elements, which is above the other one of the two separating elements, and the second filtrating room is disposed between the two separating elements.

\* \* \* \* \*